(12) United States Patent  
Foltin et al.

(10) Patent No.: US 9,970,752 B2
(45) Date of Patent: May 15, 2018

(54) METHOD AND DEVICE FOR DETERMINING A HEADLIGHT RANGE ALIGNMENT

(71) Applicant: Robert Bosch GmbH, Stuttgart (DE)

(72) Inventors: Johannes Foltin, Ditzingen (DE); Marc Geese, Ostfildern Kemnat (DE); Susanne Stierlin, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/105,942

(22) PCT Filed: Oct. 29, 2014

(86) PCT No.: PCT/EP2014/073173
§ 371 (c)(1),
(2) Date: Jun. 17, 2016

(87) PCT Pub. No.: WO2015/090699
PCT Pub. Date: Jun. 25, 2015

(65) Prior Publication Data
US 2016/0320181 A1    Nov. 3, 2016

(30) Foreign Application Priority Data

Dec. 19, 2013 (DE) .......... 10 2013 226 788
Sep. 23, 2014 (DE) .......... 10 2014 219 120

(51) Int. Cl.
*G01J 1/00*      (2006.01)
*G01B 11/27*      (2006.01)
(Continued)

(52) U.S. Cl.
CPC ............. *G01B 11/272* (2013.01); *B60Q 1/10* (2013.01); *G01J 1/4257* (2013.01);
(Continued)

(58) Field of Classification Search
CPC ... B60Q 1/10; B60Q 2300/32; G01M 11/065; G01J 1/4257; G01B 11/272; G06K 9/00791
(Continued)

(56) References Cited

U.S. PATENT DOCUMENTS 4,634,275 A * 1/1987 Yoshida .............. G01M 11/065
                                                348/95
4,647,195 A * 3/1987 Ishikawa .............. G01M 11/064
                                               356/121
(Continued)

FOREIGN PATENT DOCUMENTS

DE    102008011699 A1    9/2008
DE    102008060949 A1    9/2009
(Continued)

*Primary Examiner* — Isiaka Akanbi
(74) *Attorney, Agent, or Firm* — Norton Rose Fulbright US LLP; Gerard Messina

(57) ABSTRACT

A method for determining a headlight range alignment of at least one first headlight of a motor vehicle. The motor vehicle includes at least one optical sensor which is designed for detecting at least one part of a first illuminated area of the first headlight and generating a first image having the part of the first illuminated area. The method includes the following steps: reading in the first image from the optical sensor, selecting at least one first image area in the first image, whereby a cut-off line of the first headlight is intended to be imaged in the first image area, and determining the headlight range alignment as a function of the first image area.

12 Claims, 11 Drawing Sheets

(51) Int. Cl.
  *B60Q 1/10* (2006.01)
  *G01M 11/06* (2006.01)
  *G06K 9/00* (2006.01)
  *G01J 1/42* (2006.01)

(52) U.S. Cl.
  CPC ....... *G01M 11/065* (2013.01); *G06K 9/00791* (2013.01); *B60Q 2300/32* (2013.01)

(58) Field of Classification Search
  USPC .......................................... 356/121, 399–401
  See application file for complete search history.

(56) References Cited

U.S. PATENT DOCUMENTS

| | | | |
|---|---|---|---|
| 5,321,439 A * | 6/1994 | Rogers | G01M 11/064 348/135 |
| 5,633,710 A * | 5/1997 | Kumra | B60Q 1/10 315/82 |
| 2007/0230199 A1 | 10/2007 | Eberhardt et al. | |
| 2013/0257274 A1 * | 10/2013 | Sekiguchi | F21S 48/17 315/82 |
| 2014/0129081 A1 * | 5/2014 | Ehlgen | B60Q 1/10 701/36 |
| 2014/0219506 A1 * | 8/2014 | Foltin | G06K 9/00825 382/104 |
| 2014/0301094 A1 * | 10/2014 | Ehlgen | B60Q 1/115 362/466 |
| 2015/0073654 A1 | 3/2015 | Foltin | |

FOREIGN PATENT DOCUMENTS

| | | |
|---|---|---|
| DE | 102011109440 A1 | 4/2012 |
| DE | 102011017697 A1 | 10/2012 |
| DE | 10 2011 081 354 A1 | 2/2013 |
| DE | 10 2012 102 446 A1 | 9/2013 |
| EP | 2128590 A1 | 12/2009 |
| EP | 2204771 A1 | 7/2010 |
| JP | H07144577 A | 6/1995 |
| JP | 2013031053 A | 2/2013 |
| JP | 2013203130 A | 10/2013 |

* cited by examiner

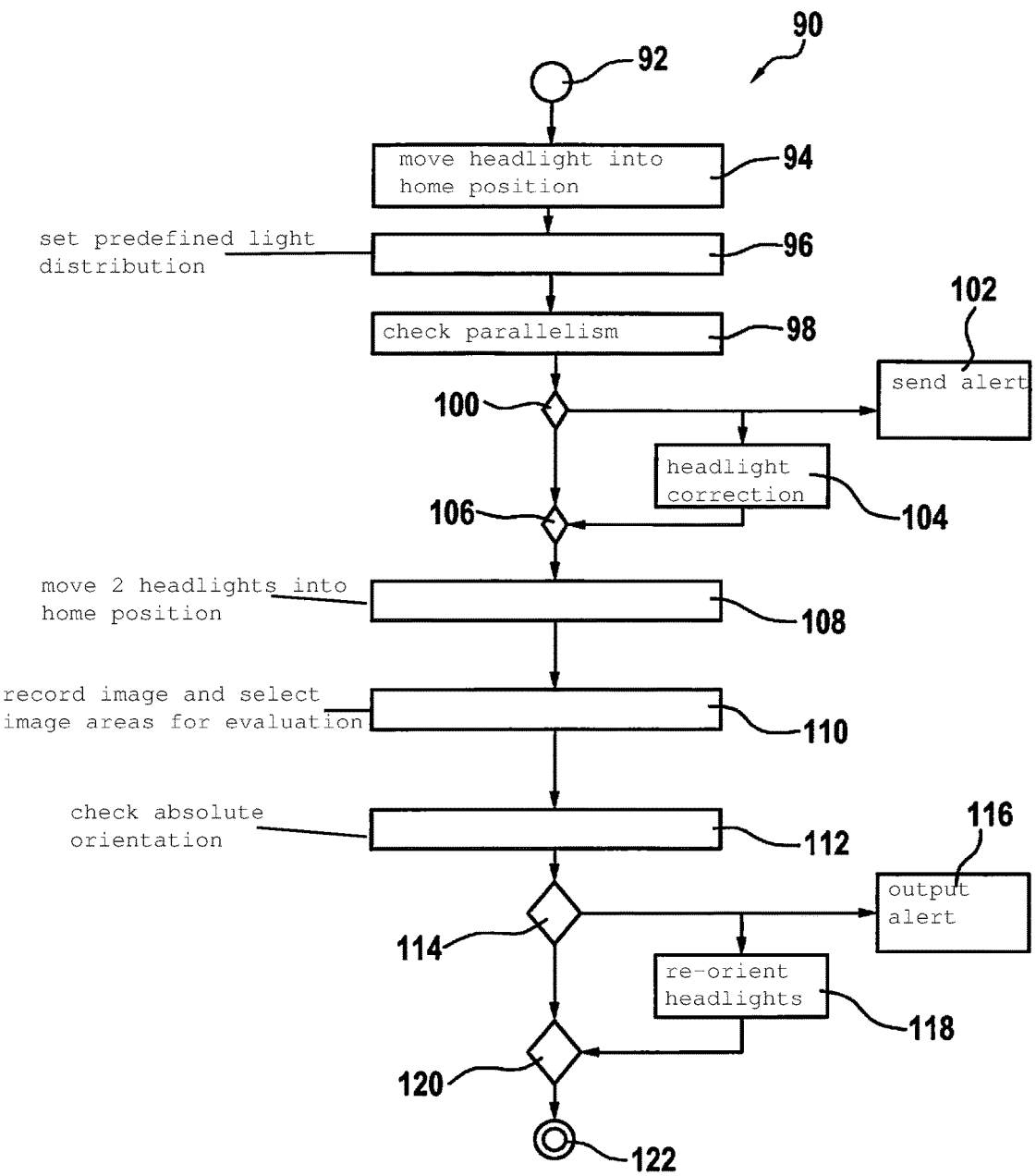

METHOD AND DEVICE FOR DETERMINING A HEADLIGHT RANGE ALIGNMENT

FIELD

The present invention relates to a method for determining a headlight range alignment of at least one first headlight of a motor vehicle. The present invention further relates to a control and evaluation unit for determining the headlight range alignment. Finally, the present invention relates to a corresponding computer program product for carrying out the method.

BACKGROUND INFORMATION

The determination of the headlight range alignment makes it possible to establish whether the particular headlight is correctly adjusted. Misadjustments of headlights having different designs may occur due to aging effects and wear and tear. A misadjustment of the headlight, in particular in association with adaptive high beam systems such as AHC (adaptive high beam control, also referred to as "gliding headlight range" or "adaptive cut-off line") and CHC (continuous high beam control, also referred to as "glare-free high beam"), may result in a blinding of other road users or may result in a vehicle driver not being provided with the maximum illumination of the surroundings. In this regard, a distinction is made, in particular, between the following misadjustments:

The front headlights of the motor vehicle are not oriented in parallel to one another, i.e., cut-off lines of the two headlights do not coincide. This is the case, for example, when one of the two headlights generates its cut-off line too close to or too far away from the vehicle.

The front headlights are correctly adjusted relative to one another, but the cut-off lines of all the headlights are situated too close to or too far away from the vehicle.

Therefore, a precondition for the reliable functioning of headlight systems is that these are correctly calibrated. This is frequently covered by, e.g., annual, vehicle inspections.

Since this is a safety-critical system, it would be desirable to be able to implement a preferably frequent and autonomous check of the headlight range alignment of at least one of the headlights in a motor vehicle.

SUMMARY

According to one aspect of the present invention, a method of the type mentioned at the outset is provided, in which the motor vehicle includes at least one optical sensor, which is designed for detecting at least one part of a first illuminated area of the first headlight and generating a first image having the part of the first illuminated area, and which includes the steps of: reading in the first image from the optical sensor, selecting at least one first image area in the first image, where a cut-off line of the first headlight is intended to be imaged in the first image area, and determining the headlight range alignment as a function of the first image area.

According to a further aspect of the present invention, a control and evaluation unit of the type mentioned at the outset are provided, the motor vehicle including at least one optical sensor, which is designed for detecting at least one part of a first illuminated area of the first headlight and generating a first image having the part of the first illuminated area, the control and evaluation unit being further designed for reading in the first image of the optical sensor, determining at least one first image area in the first image, in which a cut-off line of the first headlight is intended to be imaged, and determining the headlight range alignment as a function of the first image area.

In addition, the computer program product including program code is advantageous, which may be stored on a machine-readable carrier such as a semiconductor memory, a hard drive memory or an optical memory, and which may be used for carrying out the method according to one of the above-described specific embodiments when the program product is carried out on a computer or a device.

According to the present invention, the headlight range alignment may be regulated as a function of the cut-off line of the headlight with the aid of the optical sensor. In this case, it is advantageous when the optical sensor is a camera, in particular a matrix camera. Such cameras are frequently already available in motor vehicles, so that a particularly cost-effective and precise regulation may take place. It is further preferable when the camera is a calibrated camera, the orientation, position, and/or relative position of which with respect to the headlights is known. A particularly precise regulation may therefore take place. Alternatively or additionally, the entire system may be calibrated as necessary, both the sensor and an actuator for the at least one headlight being calibrated relative to one another.

With the aid of the present invention described here, it is possible to calibrate different misadjustments of headlights. The following is based on a typical specific embodiment of a motor vehicle, by way of example, where two front headlights may be assumed. This is intended to merely ensure the clear formulation of the following comments, and this does not rule out an expansion to four or more headlights.

A first misadjustment exists when the headlights are no longer oriented in parallel to one another, i.e., the cut-off lines of the two headlights do not coincide. For example, one of the two headlights then illuminates too intensely upward and/or downward.

A second misadjustment exists when, although the headlights are oriented parallel to one another, i.e., the cut-off lines of the two headlights coincide, the orientation of both headlights uniformly does not coincide with a desired orientation. In this case, for example, both headlights illuminate more intensely upward and/or downward than is desired. This could result in a blinding of other road users or, correspondingly, result in an inadequate visual range for the driver.

A third misadjustment exists when a combination of the two aforementioned misadjustments occurs, in which the headlights are neither in parallel nor correctly adjusted overall.

In accordance with the present invention, at least image areas of the first image of the camera are evaluated in order to ascertain the alignment of the at least one headlight and to detect the misadjustment. It is particularly preferred when the alignment is carried out on the basis of the cut-off line, which may be ascertained, for example, with the aid of a preferably predetermined gradient in a light distribution within the image. This is intended to be understood to mean that the gradient of the light distribution in the image makes a significant jump at the cut-off line and, therefore, is easy to detect. Subsequently, it is possible to change the orientation of the headlight in such a way that the actual headlight range alignment corresponds to a desired headlight range alignment.

A particular advantage of the approach according to the present invention, for example, is that the presently necessary initial headlight calibration during production of a vehicle may be dispensed with. The reasoning therefor is that, provided the camera calibration is sufficiently precise, the automatic readjustment of the headlights takes place at regular intervals during the operation of the motor vehicle. Therefore, the safety of the motor vehicle is increased overall and, simultaneously, more economical production is made possible.

In order to ascertain a possible incorrect headlight range alignment of the at least one headlight, the cut-off line of the at least one headlight is preferably first brought out of the first image area, whereby a position of the cut-off line may be reliably ascertained. Furthermore, it is possible that a corresponding measurement using a second headlight is subsequently carried out and its headlight range alignment is ascertained. The parallelism of the two headlights may be checked additionally and/or subsequently by comparing the two headlight range alignments for the first headlight and for the second headlight.

Due to design constraints, the cut-off line of a calibrated headlight must be situated in a certain area. Therefore, in an advantageous embodiment, the evaluation may be carried out in such a way that only a relatively narrow area within the first image is evaluated as the first image area. This is preferably the first image area, in which the cut-off line would have to be located in the case of correct orientation. In order to detect this, starting from an original headlight range alignment, the headlight range alignments of both headlights, which are preferably oriented in parallel, are changed simultaneously. The strongest transition, i.e., the greatest gradient, is then sought in the first image area. This may be, for example, a maximum value in a gradient image. As soon as the strongest transition is found, the present headlight range alignment may be compared with the original headlight range alignment in order to ascertain a misadjustment and/or the type of the misadjustment.

During an operation of the motor vehicle, the motor vehicle is typically located on different types of surfaces, which have different scattering and reflecting properties. The cut-off line may be detectable only with difficulty, depending on the distance, scattering behavior, and/or reflecting behavior of the particular reflecting surface. Depending on the surface, the cut-off line may then be less precisely ascertainable. Impaired visibility is due essentially to the photometric inverse square law, which describes an inverse square dependence of the brightness on the distance. As a result of the relatively great distance between the cut-off line and the sensor itself during operation, the difference between the illuminated area and a dark surrounding area becomes very small. The further the cut-off line is spaced from the sensor, the greater is the influence of the scattering behavior and/or the reflecting behavior of the surface. Furthermore, an influence of a possible surface curvature increases, which may result in a further impaired visibility of the cut-off line. Therefore, when determining the headlight range alignment, it is preferred when the at least one headlight is initially at least partially lowered. This results in a faster and easier determination of the headlight range alignment, a greater accuracy being achieved at the same time.

Furthermore, it is possible to carry out the determination of the headlight range alignment during an initial run of headlights. This initial run is known, for example, in the case of xenon lamps. A particular advantage thereof is that the headlight range alignment may be extremely reduced without causing safety-relevant problems for the driver.

The method according to the present invention described here may be used not only for detecting the typical horizontal cut-off line. This is the case, for example, in a typical low beam. Alternatively or additionally, the method described here may also be utilized in order to determine a vertical or partially horizontally and partially vertically oriented cut-off line in its headlight range alignment. This is the case, for example, with a glare-free high beam, which has slew motors as actuators and/or a matrix beam, which may selectively mask light from surrounding areas.

In this case, the headlight range alignment is typically defined by a spacing of the cut-off line from the at least one headlight. Furthermore, the illuminated area is defined by where light emitted from the at least one headlight is reflected.

Overall, a method therefore results, with the aid of which the headlight range alignment in motor vehicles may be easily determined. Overall, the safety and economic production of motor vehicles is therefore improved.

In one preferred embodiment, the additional steps are provided: selecting at least one second image area in the first image, in which a part of the first illuminated area is intended to be imaged, and/or at least one third image area, in which an area outside the illuminated area is intended to be imaged, and determining the headlight range alignment as a function of the second and/or third image area.

In this embodiment, at least one additional second image area and/or an additional third area is/are provided, which is/are evaluated in addition to or together with the first image area. It is particularly preferred when the additional image areas each directly adjoin the first image area, preferably above and/or below the first image area. It is advantageous in this case that a larger part of the first image is evaluated, so that the cut-off line may be more quickly located within the first image area. It is particularly preferred when a simplified evaluation with respect to the cut-off line is carried out in the second and/or third image area, so that the actuator may be immediately moved in the correct direction. As a result, computing capacity is additionally saved, the accelerated determination and use of the headlight range alignment being simultaneously ensured.

In a further embodiment, the following additional steps are provided: determining a reflectivity of a road surface as a function of the first, second, and/or third image area and determining the headlight range alignment as a function of the reflectivity.

In this embodiment, the reflectivity of the road surface is additionally determined, the second and/or third image area being utilized for assistance. This may be carried out, in particular, when the cut-off line is situated within the first image area and the respective additional image areas are situated either outside the illuminated area and/or within the illuminated area. A comparison of the illuminated area with the area located outside the illuminated area may then be carried out, on the basis of which inferences may be made with respect to the reflectivity, i.e., the scattering and reflection behavior of light. This physical property of the road surface may then be ascertained and taken into account in the headlight range alignment. This yields a particularly rapid and precise determination of the headlight range alignment.

In a further embodiment, the following additional steps are provided: determining a topology of a road surface, and determining the headlight range alignment as a function of the topology of the road surface.

In this embodiment, a topological course of the road surface is taken into account in the determination of the headlight range alignment. As mentioned above, the configuration of the road surface influences where the cut-off line is located. By detecting the road surface, an inference may be made as to where the cut-off line would have to be located in this specific case. On the basis of this information, the headlight range alignment may then be adapted to the present circumstances. The topology may be detected, for example, with the aid of a three-dimensional measurement using ultrasound, a stereo camera, or infrared depth-measuring sensors. Likewise, uneven areas may be detected optically, assuming an even, drivable pavement surface, and may be taken into account in determining the headlight range alignment and/or its misadjustment. This results in an even more precise determination of the headlight range alignment, the quality of which is independent of the specific circumstances. The illuminated area and/or the area outside the illuminated area may be utilized for reducing scattering and errors when ascertaining the headlight range alignment and/or misadjustment.

In a further embodiment, the following additional steps are provided: detecting movements of the motor vehicle, and determining the headlight range alignment as a function of the movements.

In this embodiment, the vehicle dynamics, i.e., movements of the vehicle about the longitudinal/transverse and vertical axes of the vehicle, are taken into account when determining the headlight range alignment. The position of the at least one headlight relative to the road surface may be ascertained as a function of the corresponding movements, in particular a rolling/pitching and yaw movement. This results in a corresponding adaptation of the desired headlight range alignment, which is utilized for determining the actual headlight range alignment. These movements may be detected by sensors already available in the vehicle, for example, by acceleration sensors, in particular 3D acceleration sensors. Overall, this results in an improvement on the accuracy of the determination of the headlight range alignment.

In a further embodiment, the following additional steps are provided: determining characteristic data series of the first, second, and/or third image areas and determining the headlight range alignment as a function of the characteristic values.

In this embodiment, at least one characteristic data series of one of the image areas is evaluated. This results in characteristic values for a light distribution within the image area. It is preferred when the image area is set up as a type of matrix, in particular having a matrix of pixels. The characteristic values each relate to data series of this matrix, i.e., rows or columns. These characteristic values are designed in such a way that they describe a brightness across the particular data series or permit an inference to be made regarding the brightness in the data series. After the determination of the characteristic values, the headlight range alignment may then take place in an easy and computationally efficient manner as a function of the characteristic values. For example, characteristic values may be configured in such a way that data series which represent dark surrounding areas have a low characteristic value. Conversely, it is then preferred to provide a data series describing the illuminated area with a correspondingly high characteristic value.

As a result, if there is a great change between the values, the position of the cut-off line may be determined in at least one dimension based on the first, second, or third image areas. In this case, it is advantageous that the determination of characteristic values of data series may take place in a very easy and robust manner, which is possible in a computationally highly efficient manner. Overall, a method is therefore provided, which makes it possible to determine the position of the cut-off line in at least one dimension very quickly and computationally efficiently.

In a further embodiment, image rows of the particular image area are used as data series of at least one of the image areas.

In this embodiment, the headlight range alignment is determined in the vertical direction of the image area. For this purpose, the particular image rows—provided these are situated essentially horizontally with respect to the plane of the road—are individually converted into characteristic values and the resultant column of characteristic values is subsequently evaluated. In this case, it is advantageous that the use of image rows is meaningful for a plurality of high beam systems, since the headlight range alignment is typically understood to mean a spacing of the motor vehicle from the cut-off line in the direction of travel. This spacing would therefore be approximately vertical in the first image.

In a further embodiment, sums of the data series of the particular image area are used as characteristic values for the data series.

In this embodiment, the characteristic values are ascertained by summing up all numerical values for pixels of a data series. As a result, it is very easily achieved that particularly bright areas form very high characteristic values, whereas less illuminated areas only generate very low characteristic values. Therefore, the method may be designed to be even more computationally efficient. Alternative options for forming characteristic values are, for example, weighted sums, normalized sums, or further qualitatively evaluating values.

By comparing the sums, the row in which the cut-off line, i.e., the transition between illuminated and dark areas, may be ascertained.

Alternatively, it is also possible that column sums are utilized, in a corresponding manner, in order to detect at least partially vertically extending cut-off lines.

Additionally or alternatively to summing, ranking filters, e.g., minimum or maximum, may be alternatively utilized for ascertaining a measure of brightness and/or gradient. Furthermore, a multiplication of the particular values in the data rows by a distance-dependent factor may also be utilized for a compensation of the decrease in brightness in the distance.

In a further embodiment, the following additional step is provided: orienting the first headlight as a function of the headlight range alignment and a setpoint orientation.

In this embodiment, the previously determined headlight range alignment is utilized for controlling the headlight itself. Overall, this results in a possibility for performing calibration by measuring the actual orientation, i.e., the present headlight range alignment, and subsequently adjusting the actual orientation to the setpoint orientation.

In a further embodiment, the following additional step is provided: determining the setpoint orientation as a function of a headlight range alignment of a second headlight.

In this embodiment, the at least one headlight is adjusted as a function of a second headlight. For this purpose, the headlight range alignment of the second headlight is preferably initially determined. This then corresponds to the setpoint orientation of the at least one headlight. Subsequently, the at least one headlight may then be adjusted with the setpoint orientation, so that, overall, a parallelism and, therefore, an identical headlight range alignment of both headlights results. Therefore, a misadjustment with respect to parallelism may be reliably and easily compensated for.

In a further embodiment, the following additional step is provided: adjusting the at least first headlight in a predefined basic orientation.

In this embodiment, the first headlight is initially brought into the predefined basic orientation for determining the headlight range alignment and preferably also for adjusting the headlight as a function of the setpoint orientation. The predefined basic orientation is preferably close to the motor vehicle, so that a particularly good detection with the aid of the sensor is possible. Furthermore, this prevents other motor vehicles or road users from being blinded. In this case as well, the safety and the accuracy of the headlight range alignment and the corresponding adjustment are substantially increased.

In a further embodiment, a driver-side illuminated area is utilized as the first illuminated area.

In this embodiment, the driver-side illuminated area is preferably provided as the first illuminated area. This is the left illuminated area in the case of right-hand traffic and is preferably the right illuminated area in the case of left-hand traffic. The cut-off line of these driver-side illuminated areas are each typically situated closer to the motor vehicle than on the passenger-side. Therefore, a particularly accurate and reliable detection of the headlight range alignment and/or adaptation of the headlight range alignment may be carried out as a function of a setpoint orientation and, simultaneously, a blinding of other road users may be effectively prevented.

Exemplary embodiments of the present invention are represented in the figures and are described in greater detail below.

BRIEF DESCRIPTION OF THE DRAWINGS

FIG. 13 shows a flow chart of a preferred exemplary embodiment of the method.

DETAILED DESCRIPTION OF EXAMPLE EMBODIMENTS

Figure 1:
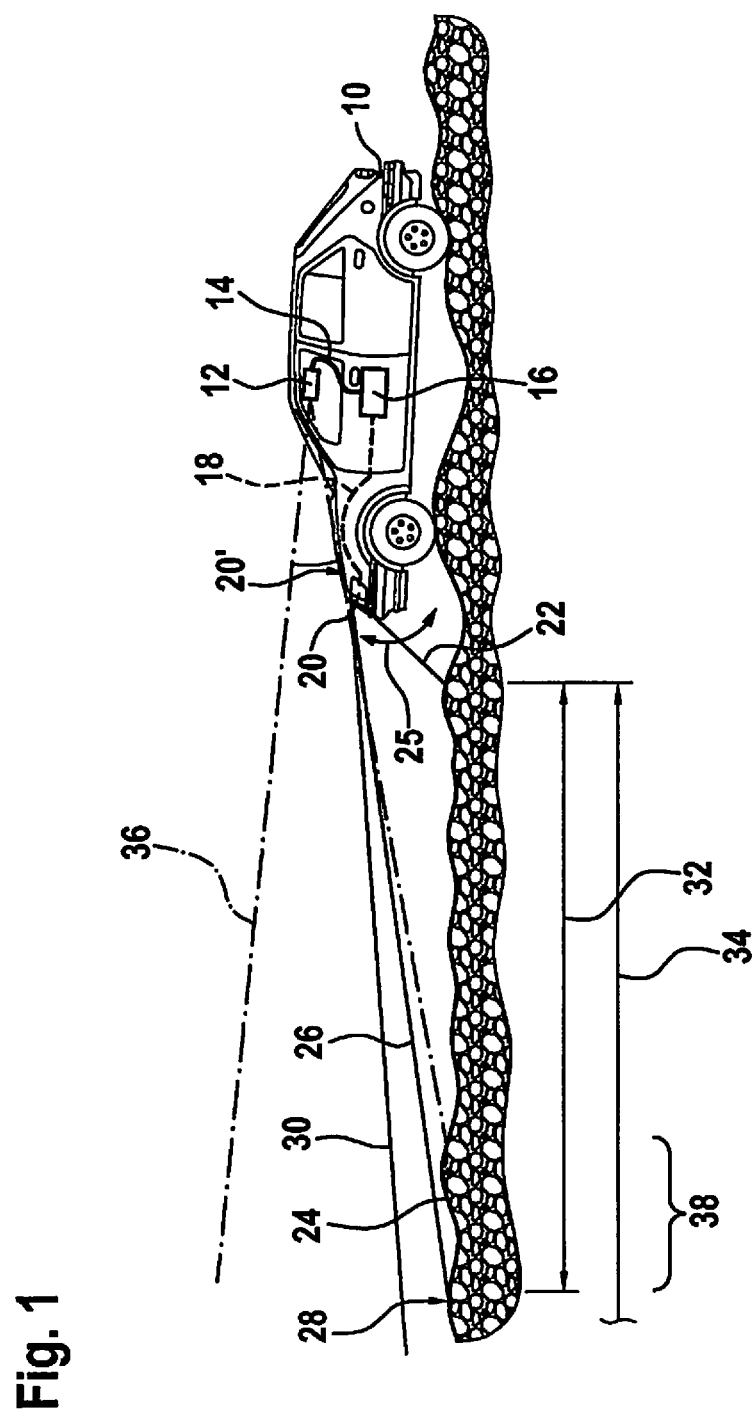
FIG. 1 shows a motor vehicle including a headlight and an optical sensor.

FIG. 1 shows a motor vehicle 10 including a camera 12. Camera 12 is designed as a matrix camera. It is furthermore connected via a data line 14 to a control and evaluation unit 16. Control and evaluation unit 16 is also connected via a data line 18 to a first headlight 20 of motor vehicle 10 for control purposes.

The example represented here relates to a motor vehicle designed for right-hand traffic. Headlight 20 emits a light cone 22, which is reflected on a road surface 24. Light cone 22 may be pivoted, in its entirety, in the direction of arrows 25 via an actuator of headlight 20. Light cone 22 has a first upper limit 26 on the driver side, which defines a cut-off line 28 on road surface 24. In addition, light cone 22 has a second, passenger-side upper limit 30. In this case, upper limits 26 and 30 are situated next to one another as viewed in the direction of travel. Passenger-side upper limit 30, together with road surface 24, also forms a cut-off line, this cut-off line is not represented here for the sake of clarity. This results in a driver-side illuminated area 32 and an illuminated area 34 generated on the passenger side.

Camera 12 is oriented in the direction of travel of motor vehicle 10 and records a surrounding area ahead of motor vehicle 10, which is located within a recording range 36 of camera 12.

As is apparent in FIG. 1, when an image is recorded in the area of road 24, a part 38 of illuminated areas 32 and 34 results, which is recorded by camera 12.

Figure 2:
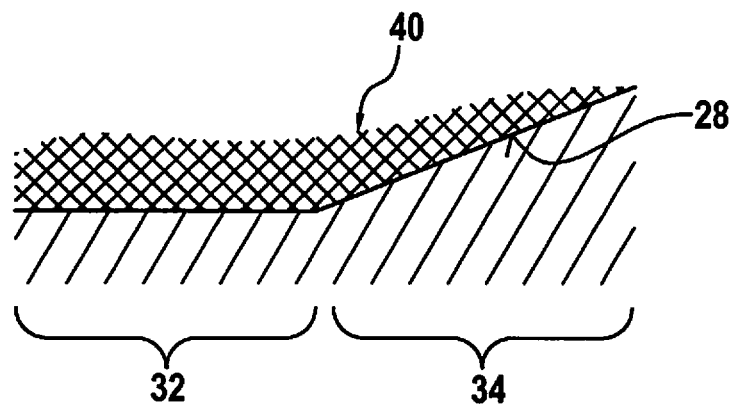
FIG. 2 shows a first illuminated area.

FIG. 2 shows a typical scene of the type recorded by camera 12. In this case, driver-side illuminated area 32 is situated below cut-off line 28. Next to driver-side illuminated area 32, passenger-side illuminated area 34 is also apparent below cut-off line 28. The two illuminated areas 32 and 34 differ from one another in this case in that passenger-side illuminated area 34 appears higher in this projection and therefore has a higher headlight range in this area. It is also apparent in FIG. 2 that cut-off line 28 separates area 40 located outside the illuminated area from illuminated areas 32 and 34. Such a scene may occur, for example, in the case of a low beam.

Figure 3:
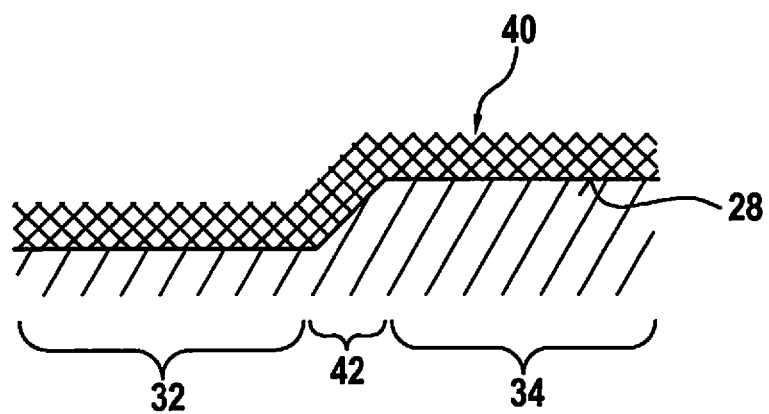
FIG. 3 shows a second illuminated area.

FIG. 3 shows a further example of a scene of the type recorded by camera 12. This is an alternative configuration of the illuminated areas, for example, due to another type of headlight 20. In contrast to FIG. 2, an intermediate area 42 is apparent between illuminated areas 32 and 34, which creates a transition between illuminated areas 32 and 34, so that cut-off lines 28 both of driver-side and passenger-side illuminated areas 32 and 34 appear as horizontal lines.

Figure 4:
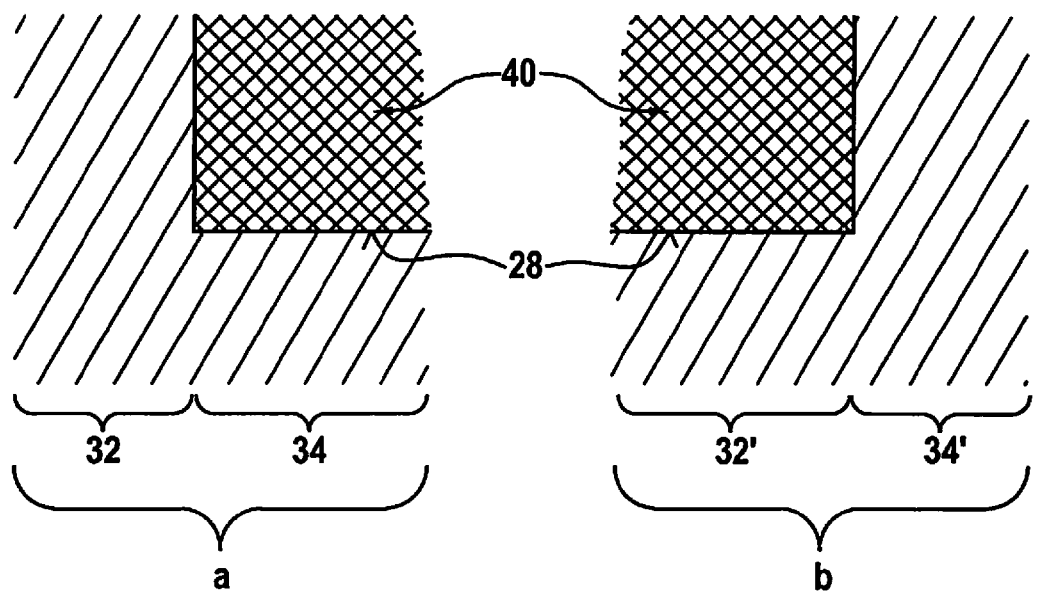
FIG. 4 shows two illuminated areas having a horizontal and vertical cut-off line.

FIG. 4 shows a further scene of the type which may be recorded by camera 12 when a further type of headlight 20 is utilized. This is a left headlight 20 in a section a and a right headlight in a section b. The two headlights together generate a so-called glare-free high beam, for example, by a matrix beam. A particularity which is apparent here is that, in section a, driver-side illuminated area 32 is formed without a horizontal cut-off line 28, i.e., it points into an indefinite distance. Contrasted therewith is passenger-side illuminated area 34' in section b, which is assigned to the passenger-side headlight.

Passenger-side illuminated area 34 in section a, in turn, has a horizontally situated cut-off line 28, which is delimited by a vertical course of cut-off line 28. Driver-side illuminated area 32' is formed in a corresponding manner in section b. Therefore, area 40 located outside illuminated areas 32, 34, 32' and 34' is formed as a section, which may mask, for example, preceding motor vehicles in order to thereby avoid a glare. In the case of such headlights 20, it is advantageous when both a horizontal and a vertical orientation of the headlights may be determined and preferably calibrated.

Figure 5:
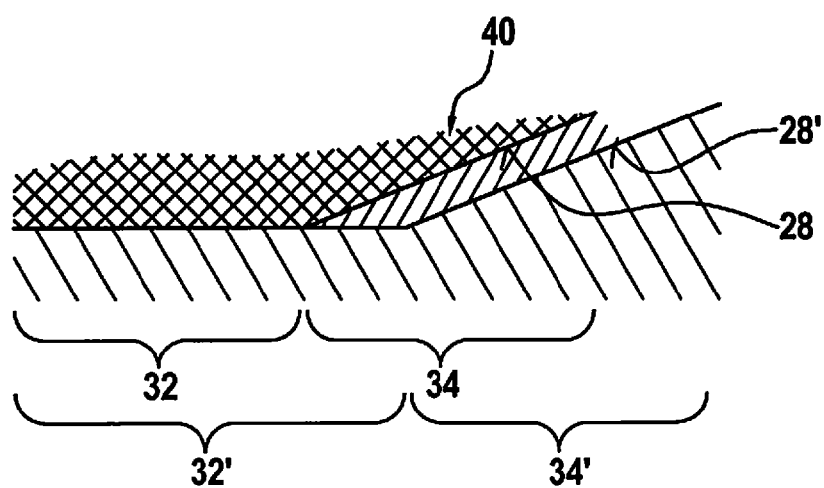
FIG. 5 shows an area illuminated by two headlights, the two headlights being incorrectly oriented relative to one another in the horizontal direction.

FIG. 5 shows a first misadjustment of two headlights relative to one another. This misadjustment is based on the fact that, although the two headlights are oriented in parallel to one another, the horizontal orientation is incorrect.

It is clear from FIG. 5 that, in this type of misadjustment, cut-off line 28 of driver-side headlight 20 and cut-off line 28' of the passenger-side headlight are at least partially superimposed. Correspondingly, driver-side illuminated areas 32 of headlight 20 and 32' of the passenger-side headlight are shifted horizontally relative to one another.

This applies correspondingly for passenger-side illuminated areas 34 and 34'. Such a state of illuminated areas 32, 34, 32' and 34' must then be corrected in the horizontal direction.

Figure 6:
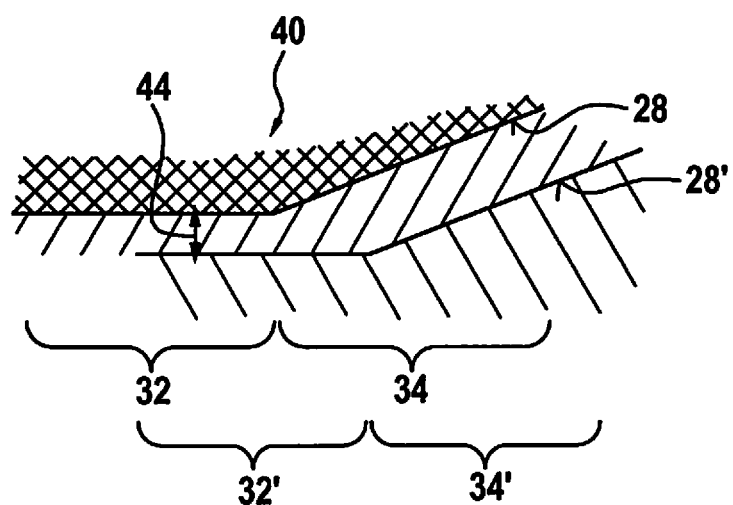
FIG. 6 shows the illuminated areas from FIG. 5, the two illuminated areas being additionally incorrectly oriented relative to one another in the vertical direction.

FIG. 6 shows a second misadjustment of two headlights relative to one another. This misadjustment is based on the fact that, although the two headlights are not oriented in parallel to one another, the horizontal orientation is incorrect. In this case, a correction of the type already described with reference to FIG. 5 is necessary. In addition, the headlights also need to be oriented relative to one another in vertical direction 44 in order to achieve a parallel orientation.

Figure 7:
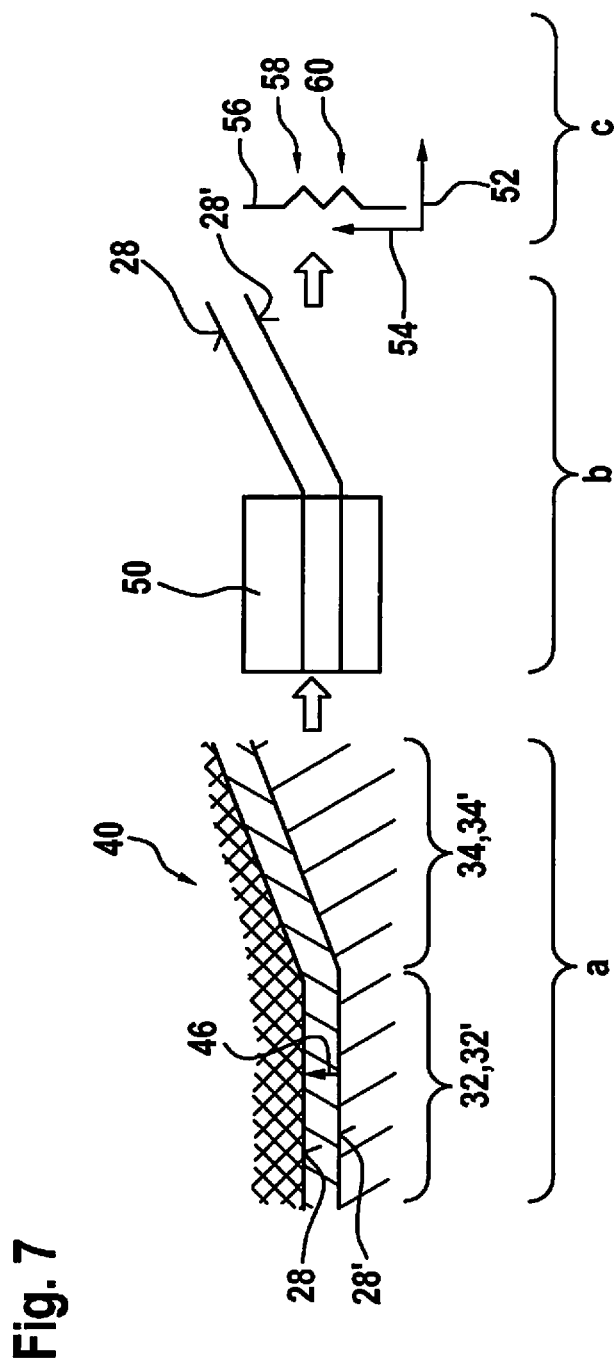
FIG. 7 shows a first evaluation of two illuminated areas, which are incorrectly vertically oriented relative to one another.

FIG. 7 shows a further misadjustment, where the headlights are not situated in parallel to one another. This is apparent from the vertical shift of cut-off lines 28 and 28' relative to one another. In this case, the passenger-side headlight and, therefore, its cut-off line 28' must be shifted in the direction of arrow 46 toward cut-off line 28.

Section b shows the course of cut-off lines 28 and 28', these lines being detected partially within a first image area 50. Image area 50 has a matrix-like configuration and includes data series in the horizontal and vertical directions, i.e., pixel rows and pixel columns. Characteristic values are now ascertained along the particular pixel rows in order to detect the position of the particular sections of cut-off lines 28 and 28' in the vertical direction. This takes initially place here as a function of a gradient image, particularly high values then being present in the area of cut-off lines 28 and 28' and no values or only small values being present in the other areas. Forming the characteristic values, preferably by row-by-row summation, results in a very easily evaluated and schematic representation of the type shown in section c. A coordinate system having an abscissa 52 and an ordinate 54 is represented here for better understanding. Abscissa 52 has the quantitative value of the characteristic value. Ordinate 54 assigns the characteristic values to the individual rows. A characteristic series 56, made up of the characteristic values, is represented within the coordinate system. Two maxima 58 and 60 are apparent within characteristic data series 56. These correspond to the vertical locations of cut-off lines 28 and 28', respectively. Therefore, the relative position of the two headlights relative to one another may be ascertained very easily and quickly by evaluating the characteristic data series.

Figure 8:
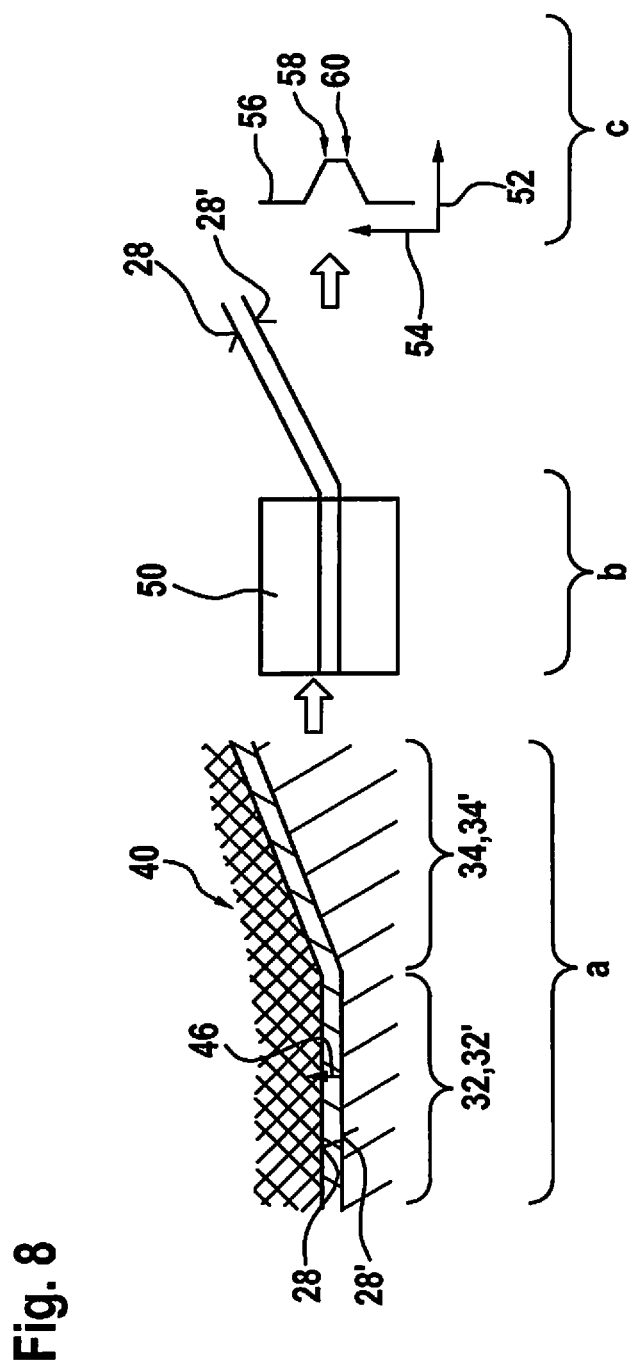
FIG. 8 shows a second evaluation of two illuminated areas, which are incorrectly vertically oriented relative to one another.
Figure 9:
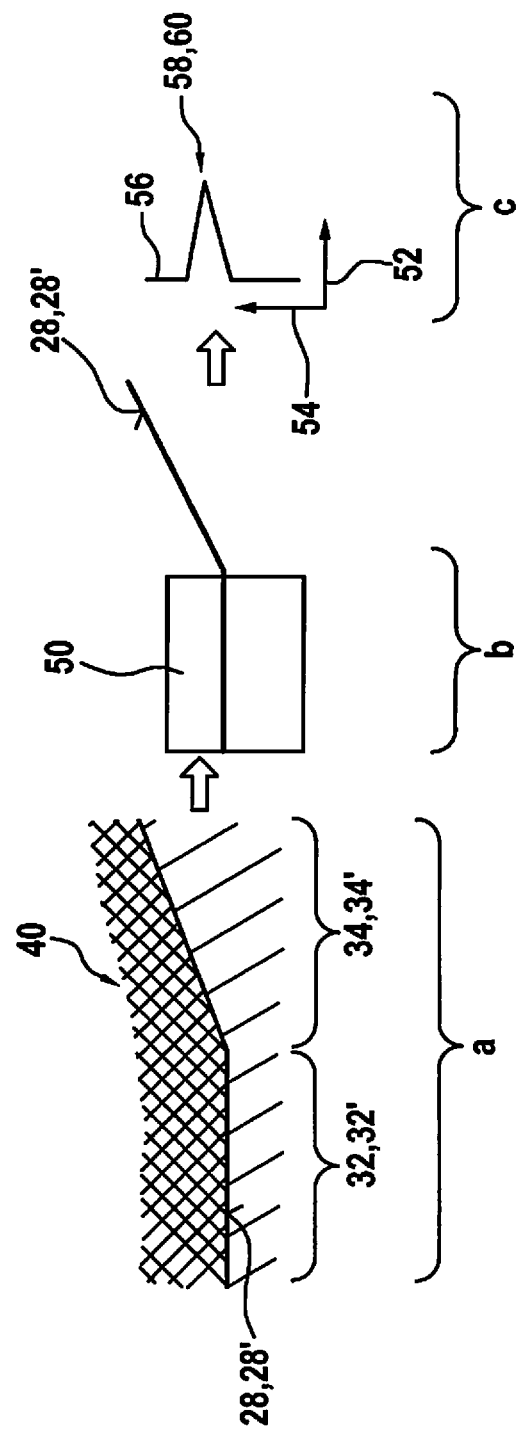
FIG. 9 shows a third evaluation of illuminated areas, which are oriented correctly relative to one another.
Figure 10:
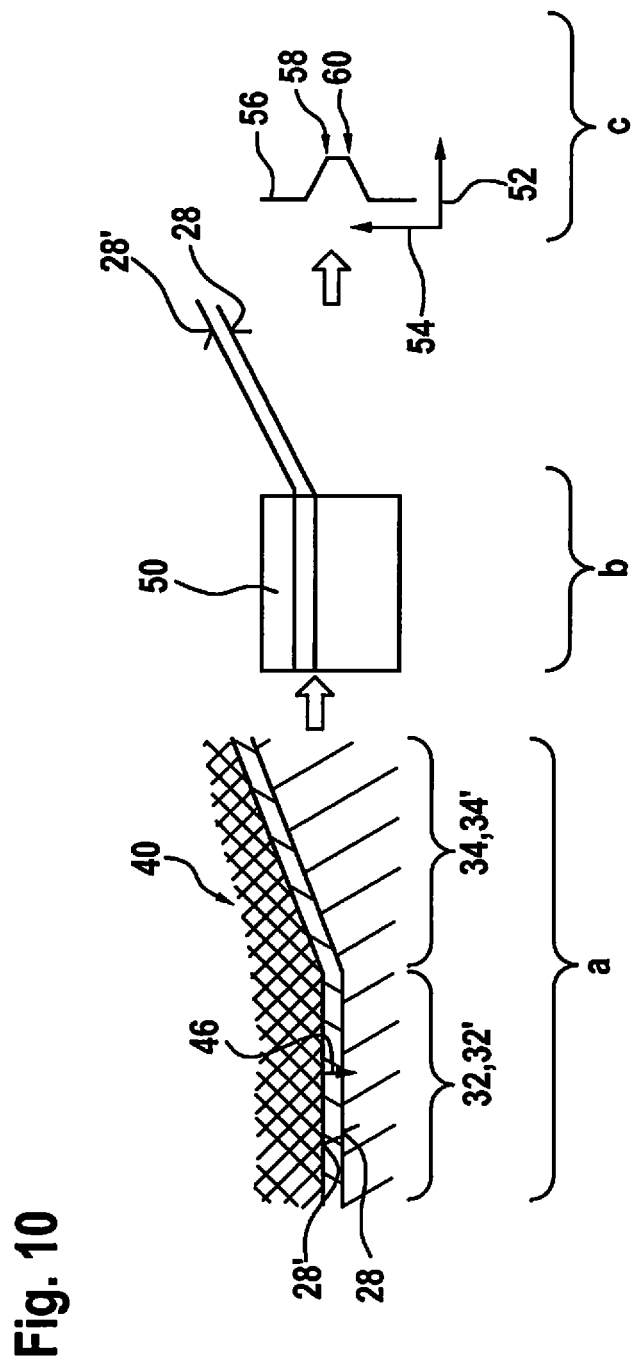
FIG. 10 shows a fourth evaluation of two illuminated areas, which are incorrectly vertically oriented relative to one another.

In order to clarify this method, different headlight range alignments of the headlights relative to one another are represented in FIGS. 8 through 10 and their effects on characteristic series 56 are described.

A situation similar to that in FIG. 7 is represented in FIG. 8, where cut-off line 28' has been already partially shifted in the direction of cut-off line 28. In characteristic series 56, it is apparent that maxima 58 and 60 were moved toward one another, so that a uniform curve forms between the two maxima 58 and 60. This is an indication that cut-off lines 28 and 28' are located very close to one another.

FIG. 9 shows the error-free case, where cut-off lines 28 and 28' coincide. This results in a particularly high maximum in the characteristic data series, since maxima 58 and 60 cumulatively coincide.

FIG. 10 shows a situation similar to that in FIG. 8, where cut-off line 28' is situated above cut-off line 28, however, so that cut-off line 28' must be shifted in the vertical direction downward toward cut-off line 28.

The depictions in FIGS. 7 through 10 may be considered to be "snap shots," which could occur when an embodiment of the method according to the present invention is carried out. In this case, the FIGS. 7 through 10 would form a chronological sequence in accordance with their numbering in ascending order. This method may be considered to be a type of local maximum search.

At the first point in time, in FIG. 7, cut-off lines 28 and 28' are situated far apart and the positions thereof are then changed in direction 46.

At the second point in time, in FIG. 8, cut-off lines 28 and 28' are already situated closer to one another. They are still not correctly oriented, however. Maxima 58 and 60 of characteristic series 56 in FIG. 8 already have higher absolute values than maxima 58 and 60 from FIG. 7. This indicates an improvement on the orientations of the headlights from the situation in FIG. 7 to the situation in FIG. 8. The headlight position is subsequently changed further in direction 46.

At the third point in time, in FIG. 9, cut-off lines 28 and 28' are ideally situated on top of one another. Maxima 58 and 60 are situated on top of one another, are thereby cumulative and therefore have the maximum absolute value. At this point in time, it is not yet certain whether maxima 58 and 60 have reached their highest possible absolute value, which may be reached by shifting cut-off lines 28 and 28'. Therefore, cut-off lines 28 and 28' are shifted further in previous direction 46.

At the fourth point in time, in FIG. 10, cut-off lines 28 and 28' are no longer ideally situated above one another. Maxima 58 and 60 have lower absolute values than maxima 58 and 60 from FIG. 9. On the basis thereof, it may be inferred that the position of cut-off lines 28 and 28' in FIG. 9 is the optimal position. Finally, the headlights may be controlled in such a way that they assume this optimal position.

Figure 11:
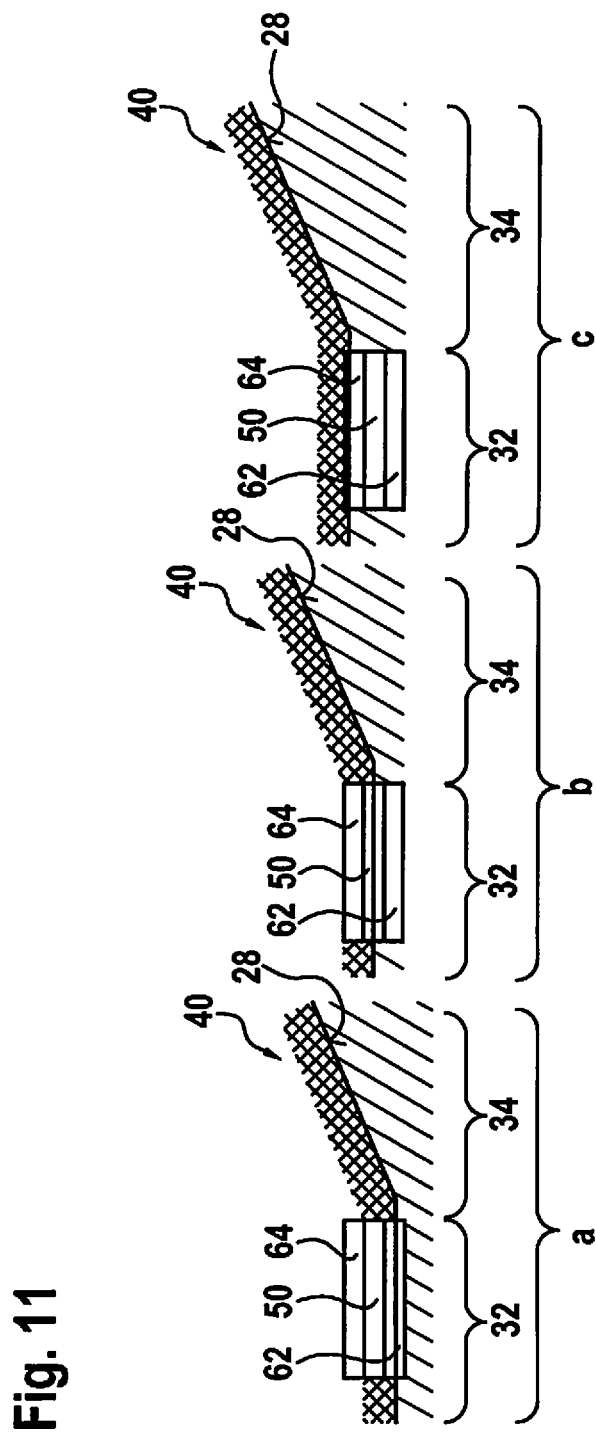
FIG. 11 shows the utilization of three image areas for locating the cut-off line.

FIG. 11 shows a further exemplary embodiment of the method according to the present invention. In this case, a second image area 62 and a third image area 64 are used in addition to image area 50, which is used in a manner corresponding to that described with reference to FIGS. 7 through 10. Second image area 62 is situated below first image area 50 as viewed in the vertical direction. Third image area 64 is situated above first image area 50 as viewed in the vertical direction. By using these three image areas 50, 62 and 64, which differ from one another, it is possible to configure the method to be highly efficient. It is not necessary to carry out a highly complex and precise evaluation of the position of cut-off line 28 within image areas 62 and 64. It is sufficient if it is detected that cut-off line 28 is situated within second image area 62, as represented. In this case, image area 50 forms a setpoint area, in which cut-off line 28 must be located in order to ensure correct orientation of the headlight range alignment. As a result of a simple detection that cut-off line 28 is located within image area 62, cut-off line 28 may be quickly moved into first image area 50, where a highly precise orientation of the headlight range may then be carried out.

A scene is represented in section b, on the basis of which it becomes clear that cut-off line 28 is situated within first image area 50. Therefore, the method may then be carried out immediately in a highly precise manner.

The case which is complementary to section a is represented in section c. In this case, cut-off line 28 is located within third image area 64. Therefore, cut-off line 28 must be moved in the vertical direction downward to image area 50.

It also becomes clear from section b that the illuminated area is situated within image area 62 when cut-off line 28 is correctly positioned. At the same time, dark area 40 is located in third image area 64. As a result of evaluating second and third image areas 62 and 64, inferences may therefore be made regarding the reflectivity of the illuminated road surface. On the basis of this reflectivity, it is possible to adapt and improve the evaluation within image area 50. On the basis thereof, it may be concluded how high the gradient would have to be. For example, a high reflectivity and a low scattering rate result in a very strong gradient, whereas a fuzzy, "blurred" transition is to be detected in the case of low reflectivity and high scattering.

Figure 12:
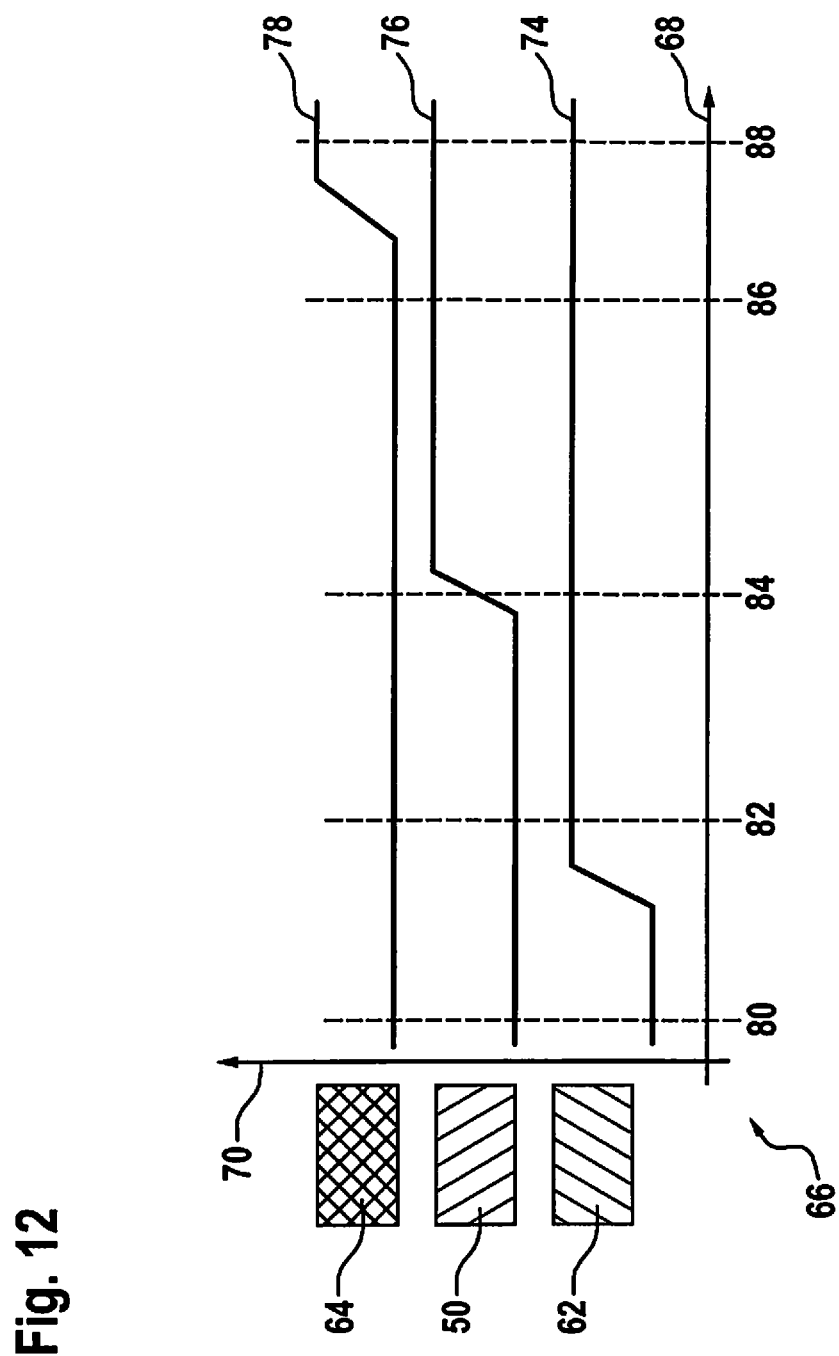
FIG. 12 shows a gradient curve in the case of the procedure according to FIG. 11.

FIG. 12 describes one possibility for the qualitative determination of the light angle as a function of first, second, and third image areas 50, 62 and 64. A coordinate system 66, which has an abscissa 68 and an ordinate 70, is represented for this purpose. Abscissa 68 corresponds to a light angle of headlight 20, i.e., an orientation of light cone 22 in the direction of arrows 25. Ordinate 70 qualitatively describes a mean within image areas 50, 62 and 64. A progression of the mean for image area 62 is represented with the aid of curve 74. A progression of the mean for area 50 is represented with the aid of curve 76. A progression of the mean for third image area 64 is represented with the aid of a curve 78. In this case, it should be noted that these curves 74, 76 and 78 each have a lower and an upper value, the lower values of curves 74, 76 and 78 being identical to one another. These correspond to the illuminating value within dark area 40. In addition, the upper value of curves 74, 76 and 78 likewise corresponds to the same brightness value, this brightness value corresponding to a mean, which is present in the case of an image area, which completely covers illuminated area 32.

Within coordinate system 66, the values for five exemplary light angles are emphasized at points 80, 82, 84, 86 and 88.

At point 80, it is apparent that the mean within all three image areas 50, 62 and 64 is located at the lower value. It may therefore be assumed that cut-off line 28 is situated, in the vertical direction, below and outside all three image areas 50, 62 and 64. This is due to the fact that all three image areas 50, 62 and 64 therefore represent dark area 40.

At point 82, only second image area 62 is fully illuminated. Therefore, cut-off line 28 is situated exactly between first image area 50 and second image area 62.

At point 84, second image area 62 is fully illuminated, first image area 50 is partially illuminated, and third image area 64 is not illuminated. This results, for example, in the optimal position, as is represented in FIG. 11, section b.

At point 86, both first and second image areas 50, 62 are fully illuminated and third image area 64 is not illuminated. Therefore, the cut-off line is situated between first image area 50 and second image area 64.

At point 88, all image areas 50, 62 and 64 are fully illuminated. Therefore, cut-off line 28 is situated above and outside all image areas 50, 62 and 64.

As a result of the qualitative evaluation of individual image areas 50, 62 and 64, a qualitative headlight range alignment and/or a qualitative determination of the headlight range alignment may be carried out very quickly and efficiently.

FIG. 13 shows a flow chart 90 of a preferred exemplary embodiment of the method according to the present invention.

The method begins at a start point 92.

In a subsequent step 94, headlight 20 is moved into a predefined home position.

In a step 96, a predefined light distribution of headlight 20 is preferably set, which generates a particularly good cut-off line 28, so that the determination of the headlight range alignment is made possible in a highly precise manner.

Subsequently, in step 98, a check of parallelism of first headlight 20 relative to the second headlight is carried out.

In a further step 100, the result from step 98 is checked and the following step is selected.

If this is not the case, an alert is output to a driver of the motor vehicle in an additional step 102. In addition, in a further step 104, a headlight correction is carried out, as is described, for example, with reference to FIGS. 6 through 10. The method is subsequently continued in step 106.

If it is established in step 100 that the headlights are already parallel to one another, the method is immediately continued in step 106.

In a further step 108, the two headlights are moved into a second home position and a second light distribution is set for measuring purposes. The second home position and the second light distribution are used for setting a horizontal orientation of the two headlights relative to one another.

In a further step 110, another image is recorded and image areas are selected for evaluation. These image areas may be selected in a manner analogous to image areas 50, 62 and 64, these image areas being situated next to one another in the horizontal direction.

In a further step 112, the absolute orientation of the headlights is checked. This is also carried out in a manner analogous to the previously described procedures and with reference to predefined setpoint values.

In a further step 114, a decision is made as to whether the orientation of the headlights is correct overall. If this is not the case, a corresponding alert is output to the driver in a further step 116 and, in addition, the recorrection of the orientation of the headlights is carried out in a step 118. The method is subsequently continued in a further step 120.

If it is established in step 114 that the orientation is correct, the method is immediately continued in step 120.

The method ends in a final step 122.

The exemplary embodiments described and shown in the figures are selected merely by way of example. Different exemplary embodiments may be combined with one another entirely or with respect to the individual features. One exemplary embodiment may also be supplemented by features of a further exemplary embodiment.

Furthermore, method steps according to the present invention may be repeated and may be carried out in a sequence other than that described.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

What is claimed is:

1. A method for determining a headlight range alignment of a first headlight and a second headlight of a motor vehicle, the motor vehicle including at least one optical sensor to detect at least one part of a first illuminated area of the first headlight and to generate a first image including the part of the first illuminated area, the method comprising:
   reading in the first image from the at least one optical sensor;
   selecting at least one first image area in the first image, wherein a cut-off line of the first headlight is intended to be imaged in the first image area;
   determining the headlight range alignment as a function of the first image area;
   orienting the first headlight as a function of the headlight range alignment and a setpoint orientation; and
   determining if there is a misadjustment of the first headlight and the second headlight relative to one another based on the setpoint orientation as a function of a headlight range alignment of the second headlight.

2. The method as recited in claim 1, further comprising:
   selecting at least one of: i) at least one second image area in the first image, in which a part of the first illuminated area is intended to be imaged, and ii) at least one third image area, in which an area outside the illuminated area is intended to be imaged; and
   determining the headlight range alignment as a function of the at least one of the second and the third image area.

3. The method as recited in claim 2, further comprising:
   determining a reflectivity of a road surface as a function of at least one of the first, second, and third image areas; and
   determining the headlight range alignment as a function of the reflectivity.

4. The method as recited in claim 1, further comprising:
   determining a topology of a road surface; and
   determining the headlight range alignment as a function of the topology of the road surface.

5. The method as recited in claim 1, further comprising:
   detecting movements of the motor vehicle; and
   determining the headlight range alignment as a function of the movements.

6. The method as recited in claim 1, further comprising:
   determining characteristic values for a data series of the first image area; and
   determining the headlight range alignment as a function of the characteristic values.

7. The method as recited in claim 6, wherein image rows of the first image area are used as the data series.

8. The method as recited in claim 6, wherein sums of the data series of the first image area are used as characteristic values for the data series.

9. The method as recited in claim 1, further comprising:
   orienting the at least first headlight in a predefined basic orientation.

10. The method as recited in claim 1, wherein a driver-side illuminated area is used as the first illuminated area.

11. A control and evaluation unit for determining a headlight range alignment of a first headlight and a second headlight of a motor vehicle, the motor vehicle including at least one optical sensor to detect at least one part of a first illuminated area of the first headlight and generating a first image having the part of the first illuminated area, the control and evaluation unit being configured to:
    read in the first image from the at least one optical sensor;
    determine at least a first image area in the first image, in which a cut-off line of the first headlight is intended to be imaged; and
    determine the headlight range alignment as a function of the first image area;
    orient the first headlight as a function of the headlight range alignment and a setpoint orientation; and
    determine if there is a misadjustment of the first headlight and the second headlight relative to one another based on the setpoint orientation as a function of a headlight range alignment of the second headlight.

12. A non-transitory storage medium storing program code, which is executable by a processor, comprising:
    a program code arrangement having program code for determining a headlight range alignment of a first headlight and a second headlight of a motor vehicle, the motor vehicle including at least one optical sensor to detect at least one part of a first illuminated area of the first headlight and to generate a first image including the part of the first illuminated area, by performing the following:
    reading in the first image from the at least one optical sensor;
    selecting at least one first image area in the first image, wherein a cut-off line of the first headlight is intended to be imaged in the first image area; and
    determining the headlight range alignment as a function of the first image area;
    orient the first headlight as a function of the headlight range alignment and a setpoint orientation; and
    determine if there is a misadjustment of the first headlight and the second headlight relative to one another based on the setpoint orientation as a function of a headlight range alignment of the second headlight.

* * * * *